United States Patent
Restaino, Jr. et al.

(10) Patent No.: US 6,722,583 B2
(45) Date of Patent: Apr. 20, 2004

(54) LAWN SPRINKLER ACCESSORY

(76) Inventors: Mariano Restaino, Jr., 9464 SW. 53rd St., Cooper City, FL (US) 33328; Patricia Controne Restaino, 9464 SW. 53rd St., Cooper City, FL (US) 33328

( * ) Notice: Subject to any disclaimer, the term of this patent is extended or adjusted under 35 U.S.C. 154(b) by 0 days.

(21) Appl. No.: 10/170,070

(22) Filed: Jun. 13, 2002

(65) Prior Publication Data

US 2003/0230640 A1 Dec. 18, 2003

(51) Int. Cl.[7] .................................. A62C 5/02
(52) U.S. Cl. .................. 239/310; 239/600; 137/268
(58) Field of Search ........................ 239/310, 201, 239/600; 137/268

(56) References Cited

U.S. PATENT DOCUMENTS

| 4,331,174 | A | * | 5/1982 | King, Sr. ................. 137/268 |
| 4,564,506 | A | * | 1/1986 | Saputo ..................... 137/268 |
| D333,863 | S | * | 3/1993 | Kimmons .................. 137/268 |
| D360,253 | S | * | 7/1995 | Mursch ..................... D23/225 |
| 5,441,073 | A | * | 8/1995 | Hoadley .................... 137/268 |
| 5,507,945 | A | * | 4/1996 | Hansen ..................... 137/268 |
| 5,730,364 | A | * | 3/1998 | Gertie ........................ 239/310 |
| 5,885,446 | A | * | 3/1999 | McGrew, Jr. ............... 210/91 |

* cited by examiner

Primary Examiner—Dinh Q. Nguyen
(74) Attorney, Agent, or Firm—Oltman, Flynn & Kubler

(57) ABSTRACT

A lawn sprinkler accessory with a hollow body defining a chamber for holding lawn treatment material, such as fertilizer, herbicide or insecticide. The accessory body has a hollow water inlet arm on one side and a hollow water outlet arm on the opposite side of the chamber. An access opening with a removable closure in one end of the accessory body enables the insertion of lawn treatment material into the chamber and its removal from the chamber.

20 Claims, 1 Drawing Sheet

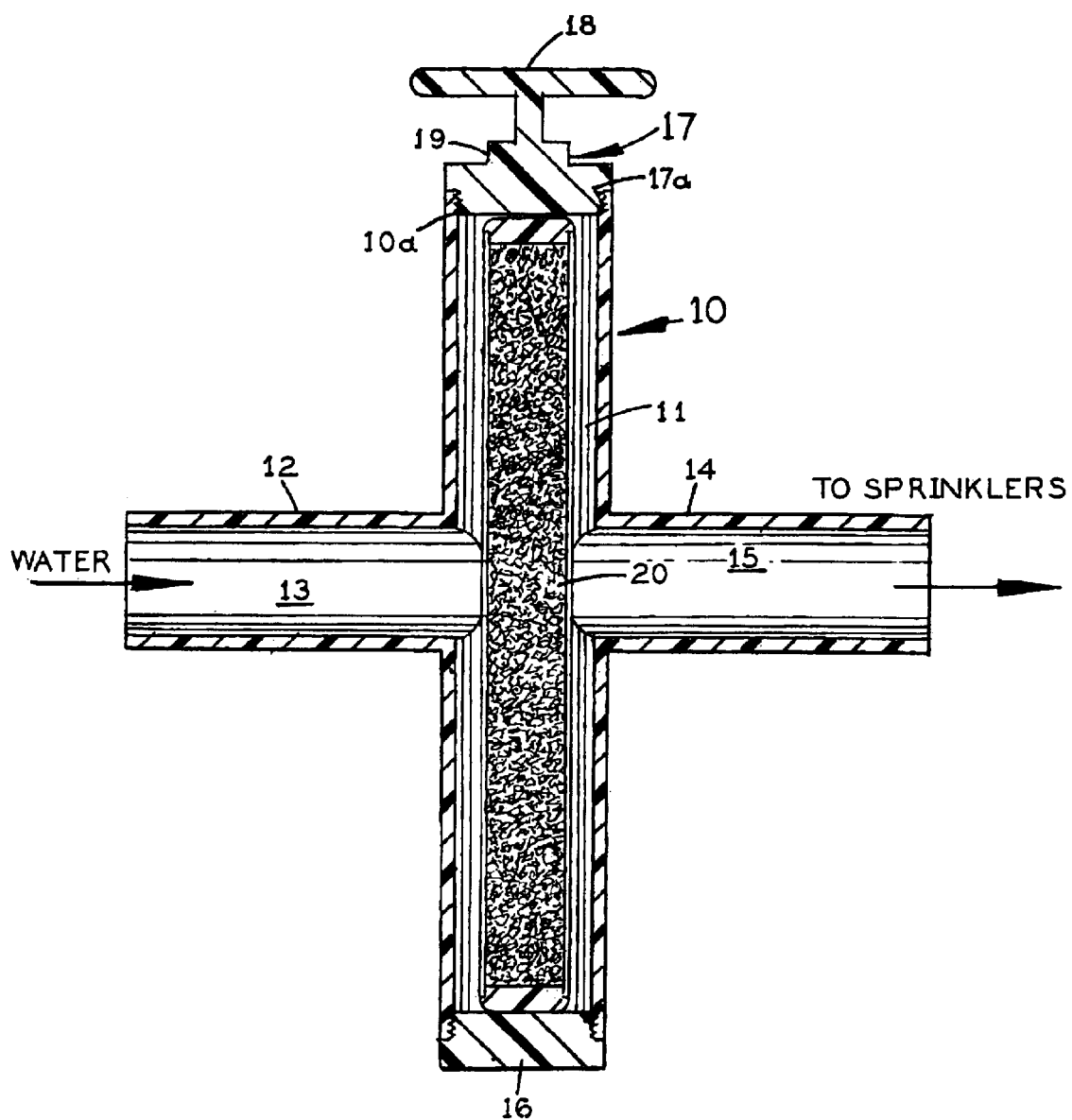

LAWN SPRINKLER ACCESSORY

BACKGROUND OF THE INVENTION

FIELD OF THE INVENTION

This invention relates to a lawn sprinkler accessory enabling the automatic addition of a lawn treatment material, such as fertilizer, herbicide or insecticide, to the water being sprinkled on the lawn.

SUMMARY OF THE INVENTION

The present invention is particularly advantageous for use with a lawn sprinkler system having in-ground conduits leading from a water supply to sprinkler heads at different locations on the lawn. However, it may be used as well with a sprinkler system having just a garden hose leading from the water supply to an on-the-ground sprinkler or a hand-held nozzle on the hose itself.

In accordance with this invention, a sprinkler accessory is provided for connection between a conventional source of water under pressure, such as a municipal water system or a well from which water is pumped, and the user's lawn sprinkler system. A supply of the chosen lawn treatment material is placed in the accessory. The supply water in passing through the accessory to the sprinkler system gradually dissolves the treatment material and entrains it, so that the treatment material is contained in the water being sprayed on the lawn.

A principal object of this invention is to provide a novel and advantageous lawn sprinkler accessory for adding a lawn treatment material to the water being sprinkled on the lawn.

Further objects and advantages of this invention will be apparent from the following detailed description of a presently preferred embodiment thereof, with reference to the accompanying drawing.

BRIEF DESCRIPTION OF THE DRAWING

The single FIGURE of the drawing is a longitudinal section through a lawn sprinkler accessory in accordance with this invention.

DETAILED DESCRIPTION OF THE INVENTION

Before explaining the present invention in detail it is to be understood that the invention is not limited in its application to the particular arrangement shown and described since the invention is capable of other embodiments. Also, the terminology used herein is for the purpose of description and not of limitation.

Referring to the drawing, in accordance with the present invention a lawn sprinkler accessory is provided for connection between the user's lawn sprinkler system and a conventional source of pressurized water, such as a municipal water supply or a well and pump at the user's site.

The present accessory comprises a hollow body or housing 10 defining a cylindrical central chamber 11 for holding a supply of water soluble lawn treatment material, such as fertilizer, herbicide or insecticide, or a treatment material that combines more than one of these common lawn treatment functions. A first hollow arm 12 projects from one side of body 10 and defines a cylindrical water inlet passageway 13 leading into chamber 11. Water inlet arm 12 is to be connected to a source of pressurized water, as above mentioned, in any suitable fashion. A second hollow arm 14 projects from the opposite side of body 10 and defines a cylindrical water outlet passageway 15 which is to be connected to the user's lawn sprinkler system, which may have a system of in-ground conduits leading to sprinkler heads at different locations on the lawn or may consist of a hose leading to a single on-the-ground sprinkler or a hand-held nozzle.

As shown, the body 10 is of cruciform shape, the chamber 11 is elongated vertically, and the water inlet and outlet arms 12 and 14 extend horizontally and centrally of the chamber 11. However, it is to be understood that the accessory body 10 may have a different shape, such as an inverted T. Also, body 10 may be positioned with its chamber 11 elongated horizontally or at any desired angle between vertical and horizontal.

The lower end of chamber 11 is closed in water-tight fashion by a bottom end cap 16 which is screw-threadedly attached to this end of body 10. Alternatively, the lower end of chamber 11 may be closed by an integral bottom wall of body 10.

The upper end of chamber 11 is closed in water-tight fashion by a top end cap 17 having a screw-threaded lower end segment 17a which is screwed into the top of body 10 at a screw-threaded access opening 10a therein at this end of chamber 11. A handle 18 for end cap 17 is either formed integral with it or attached to it in any suitable way, so that end cap 17 can be attached to or removed from body 10 by turning its handle 18. Also, a hexagonal segment 19 is provided on end cap 17 below the handle to facilitate the use of a wrench to attach or remove it. When the top end cap 17 is removed, the access opening 10a at the top of body 10 enables the user to insert water treatment material into chamber 11 or remove it.

Preferably, the water treatment material is either a solid body or granular and is held in a generally cylindrical holder 20 of water-permeable construction, such as wire mesh screening or a perforated tube, giving the incoming water ready access to the treatment material to dissolve it and carry it to the outlet passageway 15. Holder 20 may be either open or closed (as shown) at one or both ends. Preferably, the length of the treatment material holder 20 substantially matches that of the body chamber 11 when the opposite ends of this chamber are closed.

From the foregoing, it will be apparent that the illustrated embodiment of the invention is readily connectible to either a horizontal or vertical water supply pipe, providing a convenient way of adding a chosen lawn treatment material to the water being sprinkled on the lawn.

We claim:

1. A lawn sprinkler accessory, comprising:
    a hollow body defining an elongated chamber, a first hollow arm on said body projecting generally transversely of said chamber centrally therealong defining a water inlet passageway leading into said chamber, said first hollow arm being adapted to be connected to a source of pressurized water, and a second hollow arm on said body projecting generally transversely of said chamber centrally therealong defining a water outlet passageway leading from said chamber, said second hollow arm being adapted to be connected to a sprinkler system, an upper end of said chamber being closeable in water-tight fashion at a top end of said body at an access opening leading into said chamber, and a lower end of said chamber being closeable in water-tight fashion at a bottom end of said body;
    an elongated, hollow, water pervious holder adapted to receive water soluble lawn treatment material therein and closeable at opposite ends thereof and removably positionable in said chamber extending past said inlet and outlet passageways, said holder being of a length which substantially matches that of the body chamber;

a removable top end cap attached to said body to close said access opening in water-tight fashion, said top end cap being removable from said body for access to said chamber through said access opening to permit insertion and removal of said holder to replace said treatment material; and wherein said treatment material inside said holder at said inlet and outlet passageways is caused to be dissolved by water coming in through said first hollow arm and passing out through said second hollow arm.

2. A lawn sprinkler accessory according to claim 1, wherein said first and second hollow arms are on opposite sides of said body forming a substantially cruciform shape.

3. A lawn sprinkler accessory according to claim 1 further comprising a bottom end cap which attaches to the bottom end of the body to close the lower end of the chamber in water-tight fashion.

4. A lawn sprinkler accessory according to claim 3 wherein the bottom end cap screw attaches to the bottom end of the body.

5. A lawn sprinkler accessory according to claim 1 wherein the top end cap screw attaches to top end of the body.

6. A lawn sprinkler accessory according to claim 5, wherein said top end cap has a handle at an upper end thereof and a segment of polygonal cross-section below said handle for engagement by a wrench to turn said closure for opening and closing said access opening of the chamber.

7. A lawn sprinkler accessory according to claim 1 wherein the holder is made from a material chosen from the group consisting of wire mesh screening and perforated tubing.

8. A lawn sprinkler accessory according to claim 7 wherein the ends of the holder are open.

9. A lawn sprinkler accessory according to claim 7 wherein at least one ends of the holder is closed by an end cap.

10. A lawn sprinkler accessory according to claim 9 wherein both ends of the holder are closed by end caps.

11. A lawn sprinkler accessory according to claim 1 wherein the chamber and the holder are substantially cylindrical in cross-section.

12. A lawn sprinkler accessory according to claim 1 wherein the body is positioned with the chamber elongated horizontally.

13. A lawn sprinkler accessory according to claim 1 wherein the body is positioned with the chamber at an angle relative to the first and second hollow arms between vertical and horizontal.

14. A lawn sprinkler accessory, comprising:

a hollow body defining an elongated chamber, a first hollow arm on said body projecting generally transversely of said chamber centrally therealong defining a water inlet passageway leading into said chamber, said first hollow arm being adapted to be connected to a source of pressurized water, and a second hollow arm on said body projecting generally transversely of said chamber centrally therealong defining a water outlet passageway leading from said chamber, said second hollow arm being adapted to be connected to a sprinkler system, an upper end of said chamber being closeable in water-tight fashion at a top end of said body at an access opening leading into said chamber, and a lower end of said chamber being closeable in water-tight fashion at a bottom end of said body, said first and second hollow arms being on opposite sides of said body forming a substantially cruciform shape;

an elongated, hollow, water pervious holder adapted to receive water soluble lawn treatment material therein and closeable at opposite ends thereof and removably positionable in said chamber extending past said inlet and outlet passageways, said holder being of a length which substantially matches that of the body chamber and is made from a material chosen from the group consisting of wire mesh screening and perforated tubing;

a removable top end cap which screw attaches to top end of the body to close said access opening in water-tight fashion, said top end cap being removable from said body for access to said chamber through said access opening to permit insertion and removal of said holder to replace said treatment material;

a bottom end cap which attaches to said bottom end of said body to close said lower end of said chamber in water-tight fashion; and wherein said treatment material inside said holder at said inlet and outlet passageways is caused to be dissolved by water coming in through said first hollow arm and passing out through said second hollow arm.

15. A lawn sprinkler accessory according to claim 14 wherein both ends of the holder are closed by end caps.

16. A lawn sprinkler accessory according to claim 14 wherein the chamber and the holder are substantially cylindrical in cross-section.

17. A lawn sprinkler accessory, comprising:

a hollow body defining an elongated chamber, a first hollow arm on said body projecting generally transversely of said chamber centrally therealong defining a water inlet passageway leading into said chamber, said first hollow arm being adapted to be connected to a source of pressurized water, and a second hollow arm on said body projecting generally transversely of said chamber centrally therealong defining a water outlet passageway leading from said chamber, said second hollow arm being adapted to be connected to a sprinkler system, an upper end of said chamber being closeable in water-tight fashion at a top end of said body at an access opening leading into said chamber, and a lower end of said chamber being closeable in water-tight fashion at a bottom end of said body;

an elongated, hollow, water pervious holder adapted to receive water soluble lawn treatment material therein and closeable at opposite ends thereof and removably positionable in said chamber extending past said inlet and outlet passageways, said holder being of a length which substantially matches that of the body chamber and is made from a material chosen from the group consisting of wire mesh screening and perforated tubing;

a removable top end cap which screw attaches to top end of the body to close said access opening in water-tight fashion, said top end cap being removable from said body for access to said chamber through said access opening to permit insertion and removal of said holder to replace said treatment material;

a bottom end cap which attaches to said bottom end of said body to close said lower end of said chamber in water-tight fashion; and wherein said treatment material inside said holder at said inlet and outlet passageways is caused to be dissolved by water coming in through said first hollow arm and passing out through said second hollow arm.

18. A lawn sprinkler accessory according to claim 17 wherein the chamber and the holder are substantially cylindrical in cross-section, and both ends of said holder are closed by end caps.

19. A lawn sprinkler accessory according to claim 17 wherein the body is positioned with the chamber elongated horizontally.

20. A lawn sprinkler accessory according to claim 17 wherein the body is positioned with the chamber at an angle relative to the first and second hollow arms between vertical and horizontal.

* * * * *